United States Patent [19]
Boyett

[11] 3,875,364
[45] Apr. 1, 1975

[54] APPARATUS FOR INERT GAS SHIELDED WELDING

[76] Inventor: Dallas T. Boyett, 2321 Colony Ct., Dallas, Tex. 75235

[22] Filed: Apr. 23, 1973

[21] Appl. No.: 353,337

[52] U.S. Cl............ 219/74, 29/494, 219/136, 239/590.3
[51] Int. Cl............................. B23k 9/16
[58] Field of Search.......... 219/72, 74, 75, 61, 136, 219/137; 29/494; 239/590, 590.3, 590.5, 601

[56] References Cited
UNITED STATES PATENTS

| | | | |
|---|---|---|---|
| 2,644,070 | 6/1953 | Herbst | 219/74 |
| 2,702,846 | 2/1955 | Breymeier | 219/74 |
| 2,856,510 | 10/1958 | Jones et al. | 219/74 |
| 2,866,074 | 12/1958 | Ronay | 219/74 |
| 2,902,587 | 9/1959 | Bernard | 219/74 |
| 2,918,563 | 12/1959 | Ternisien | 219/74 |
| 2,977,457 | 3/1961 | Houldcroft et al. | 219/74 |
| 3,125,666 | 3/1964 | Gorman | 219/74 |
| 3,349,213 | 10/1967 | Gorman | 219/74 X |
| 3,450,857 | 6/1969 | Webb | 219/74 |
| 3,539,756 | 11/1970 | Scwartzbart et al. | 219/74 |

FOREIGN PATENTS OR APPLICATIONS

| | | | |
|---|---|---|---|
| 874,112 | 8/1961 | United Kingdom | 219/74 |
| 34,566 | 2/1965 | Germany | 219/74 |

*Primary Examiner*—A. Bartis
*Attorney, Agent, or Firm*—Peter J. Murphy

[57] ABSTRACT

A gas-flooding device for attachment to a welding tool tip used in heli-arc welding which includes a nonconsumable electrode projecting from a gas nozzle. The attachment device consists of a housing defining an enclosure having one open wall, a leading side wall and a trailing side wall. The attachment device is secured in tandem relation with the welding tool tip by clamp means extending forwardly of the leading wall of the housing. The housing has gas inlet means remote from its open wall and is substantially filled with a metallic mesh material, such as steel wool to diffuse and retard the flow of gas, such as argon or helium. The open wall of the housing confronts the work and includes a screen member for retaining the steel wool. The leading and trailing side walls of the housing are each provided with an open recess dimensioned to direct gas rearwardly and forwardly from the enclosure over the work. The housing includes means defining bearing surfaces disposed to engage the work on opposite sides of the weld bead whereby the welding tool tip is supported in desired spatial relationship to the work.

14 Claims, 8 Drawing Figures

PATENTED APR 1 1975

3,875,364

APPARATUS FOR INERT GAS SHIELDED WELDING

BACKGROUND AND SUMMARY OF THE INVENTION

This invention relates to an attachment device and method for arc welding in an inert gas atmosphere.

In the welding of exotic metals, such as titanium, in order to accomplish an acceptable weld both from the standpoint of structural soundness and from the standpoint of appearance, the welding must be performed in an atmosphere devoid of oxygen. In general, this is accomplished by maintaining an atmosphere of inert gas in the area of the weld during the welding operation in order to exclude air; however this inert gas atmosphere must be maintained not only at the time of welding during the fusion of the weld metal with the part to be welded, but also for a time after fusion to permit a certain amount of cooling prior to exposure to air. It has been found that the basic heli-arc technique, wherein a nonconsumable electrode is supported in a nozzle tip which floods the area with an inert gas such as helium or argon is not sufficient.

Prior known techniques for the welding of exotic metals such as titanium are cumbersome and inefficient and therefore expensive. Blum et al U.S. Pat. No. 2,914,848 illustrates a method of brazing titanium wherein the parts to be brazed together are placed within a sealed chamber which, in turn, is placed within a furnace. Rossner U.S. Pat. No. 2,068,343 illustrates a cumbersome technique for the welding of tube material.

A commonly used technique for welding irregular shaped parts involves the use of a relatively large sealed chamber, in which the parts to be welded are placed along with a welding tool and related materials, and wherein the air within the chamber can be replaced with an inert gas such as argon. The chamber is provided with armholes and associated sealed sleeves and gloves whereby a welder outside of the chamber may perform the welding within the chamber. Such a sealed chamber may also have a rotatable table upon which a plurality of parts may be placed, and be rotated into position to be welded. The difficulties and disadvantages which this technique presents are numerous. First such apparatus is expensive. A typical apparatus might consist of a heavy metal base, supporting a turntable, also supporting a plastic dome in the form of a hemisphere. The dome is removable from the base, in order to place and remove parts, and must be necessarily tightly clamped in sealed relation to the base, and must be provided with suitable armholes and sealed sleeves and gloves. Such apparatus costs thousands of dollars. Apart from the time consumed in placing the parts and removing the parts, the time for replacing the atmosphere in a dome of approximately five foot diameter might be well over 1 hour. Additionally, the conditions for welding are obviously not ideal, so that the time for accomplishing the weld is greater resulting in higher labor costs. Additionally such technique requires a large supply of the inert gas.

A principal object of this invention therefore is to provide a novel apparatus and method for the welding of titanium or other exotic metals.

Another object of this invention is to provide such improved apparatus and method which is efficient and inexpensive, and with which welds of superior quality are produced.

A further object of this invention is to provide such apparatus and method for welding titanium which permits the welding to be done in conventional work areas, and which does not involve the use of expensive auxiliary apparatus.

Still another object of this invention is to provide an attachment device for use in the heli-arc welding technique for the flooding of the weld area with inert gas.

These objects are accomplished in a gas flooding device for attachment to a welding tool, the device including a housing having one open wall and a gas inlet opening in spaced relation to the open wall. Gas diffusion means consisting of a mass of porous material is disposed within the housing between the gas inlet opening and the open wall. Clamp means mounted on the housing attaches the housing rigidly to a welding tool tip to position the housing open wall in a plane generally perpendicular to the tip, whereby when the tip is positioned in welding relation to a work surface the housing open wall is disposed adjacent to the work surface to flood the area with inert gas.

These objects are further accomplished by a method which includes the steps: creating a welding arc with a tip having an electrode for disposition in closely spaced relation with the work piece, and having a gas discharge nozzle generally concentric with the electrode; attaching to the torch tip a gas flooding device comprising a housing having an open wall for disposition generally in the plane of the work; effecting a flow of gas to the work both through the tip nozzle and through the gas flooding device; and performing the welding operation with said flooding device trailing the tip whereby the weld joint is flooded with inert gas at the time of welding and for a period of time thereafter.

The novel features and the advantages of the invention, as well as additional objects thereof, will be understood more fully from the following description when read in connection with the accompanying drawing.

DRAWING

DESCRIPTION OF THE PREFERRED EMBODIMENTS

Figure 2:
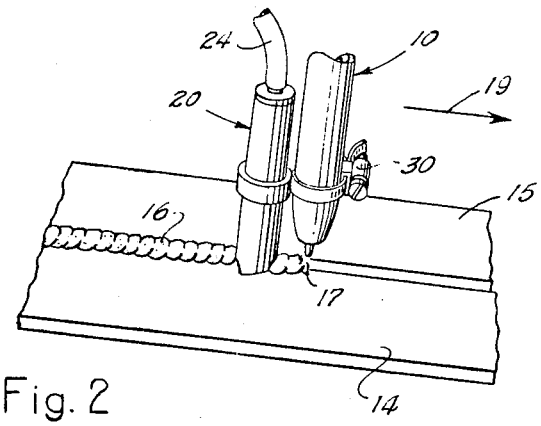
FIG. 2 is a perspective view of the assembly of FIG. 1 in use.

FIGS. 1 through 4 of the drawing illustrate an attachment device according to the invention in use with a tool tip in a heli-arc welding process. The heli-arc welding process involves arc welding wherein the work is connected to the ground terminal of an arc welding machine, and wherein the welding tool or tip is a holder for a nonconsumable electrode and defines a nozzle surrounding the electrode for the flowing an inert gas such as argon or helium onto the work during welding. The arc is struck between the electrode and the work, and the weld rod is fed separately to the weld joint.

Figure 1:
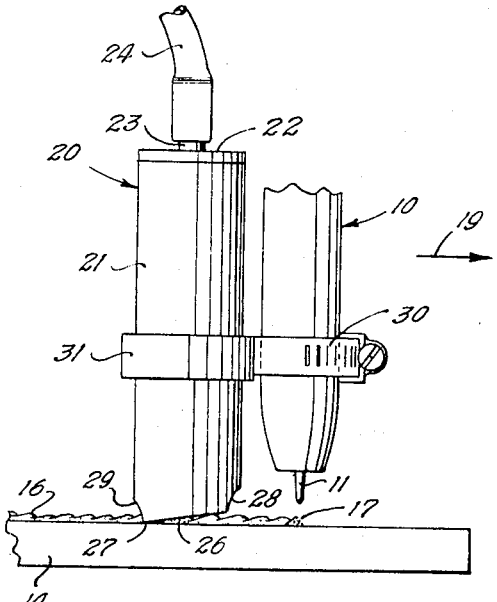
FIG. 1 is an elevation view of one form of gas flooding device in use with a welding torch on horizontally disposed work.
Figure 3:
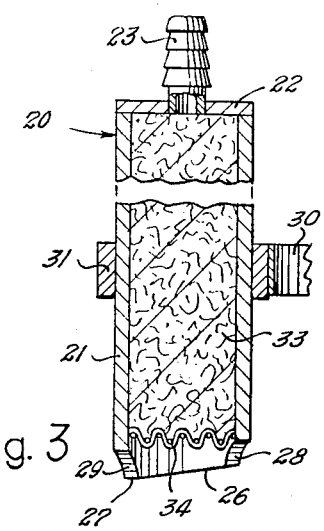
FIG. 3 is a longitudinal sectional view of the device of FIG. 1.
Figure 4:
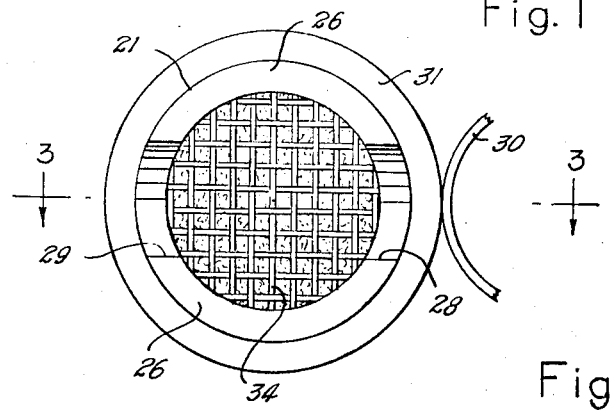
FIG. 4 is a bottom view of the device of FIG. 3.
Figure 5:
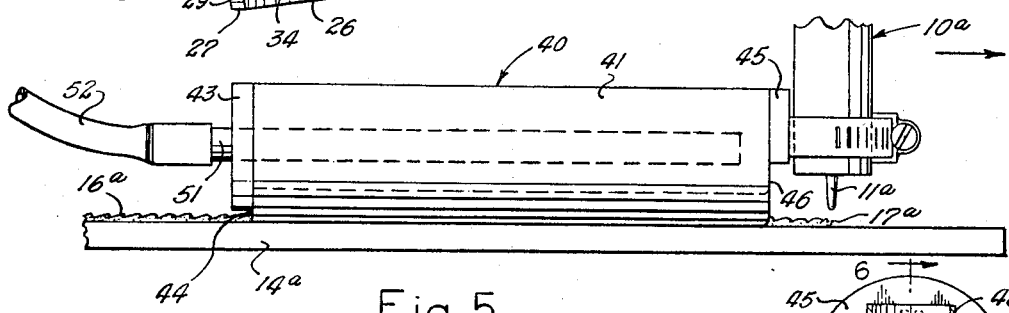
FIG. 5 is an elevation view of an alternative form of gas flooding device in use with a welding torch on horizontally disposed work.
Figure 6:
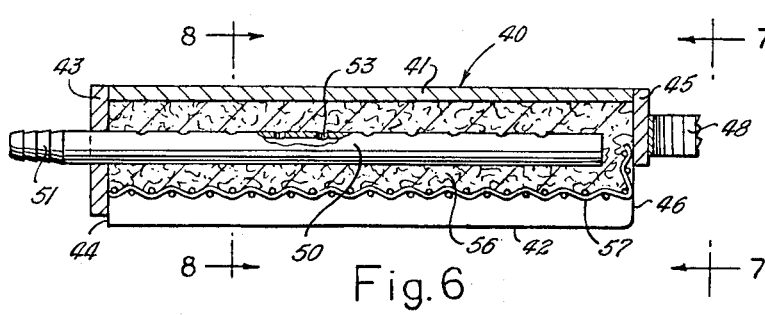
FIG. 6 is a longitudinal sectional view, in a vertical plane, of the device of FIG. 5.
Figure 7:
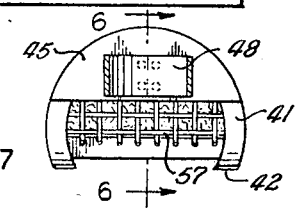
FIG. 7 is an end view of the device as viewed from the plane 7—7 of FIG. 6.
Figure 8:
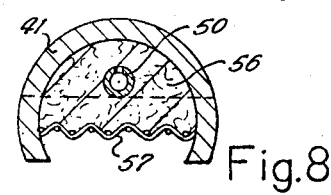
FIG. 8 is a transverse sectional view taken in the plane 8—8 of FIG. 6.

FIGS. 1 and 2 of the drawing illustrate such a welding tool tip 10 which supports a nonconsumable electrode 11 fabricated of tungsten or carbide for example, which electrode projects centrally from the end of the welding tip. The tip is hollow and is connected by means not shown to a source of inert gas, such as argon, for flowing the argon gas from the tip in the form of a stream which surrounds the tip of the electrode, the arc, and the weld puddle.

In these figures, the work is illustrated as two pieces 14 and 15 of metal such as titanium which are being welded together to form a joint 16 which is illustrated by a bead of weld metal. The work pieces are illustrated as being flat pieces which would normally be supported on a flat metal table grounded to the welding machine. It will be appreciated however that these work pieces are shown only by way of illustration and the weld operation may be performed on a work piece of any configuration and in any orientation.

The gas flooding devices according to the invention may be referred to as welding trailers since they are attached to a welding tip 10 in an orientation to trail the tip in the welding operations as will be described. The welding trailer 20 illustrated in FIGS. 1 through 4 consists of a housing defined by a tubular body 21 and an end cap 22 closing one end of the body. The housing may be fabricated from any suitable material such as aluminum or stainless steel. A nipple 23 secured to the end cap 22 is preferably in a form to receive a flexible conduit or hose 24 by means of which argon or other inert gas is supplied to the trailer 20. The trailer carries any form of suitable clamp, which is illustrated as a gear type clamp 30 secured to the body 11 by means of a band 31. The clamp 30 is engaged with the welding tool tip 10 to rigidly secure the trailer to the tip in the desired relation as will be explained.

The open end of the body 21, which defines the open wall 26 of the housing, is generally planar but is inclined relative to the longitudinal axis of the housing, being angled inwardly from the trailing side toward the leading side of the trailer, the leading side of the trailer being the side adjacent to the clamp 30 or to the welding tip 10 in assembled relation. With the open wall 26 so inclined, and with the tip and trailer oriented generally vertically in use as illustrated, the trailer may be supported on the work at bearing surfaces 27 adjacent to the trailing side of the trailer. A forward facing recess is then defined between the open wall 26 and the work face which permits a substantial flow of gas from the housing toward the area of the arc and the weld puddle 17. Of course, the inclined wall also defines lateral recesses, so that the gas will flow laterally as well as toward the weld puddle. In the preferred form illustrated, a larger forward recess is defined by a notch 28 at the forward side of the body 21 opening to the wall surface 26.

If desired, and as illustrated, the trailer 20 may also be provided with a trailing recess 29 in the form of a notch formed at the trailing side of the body 21 and opening to the open end wall 26, and it is this trailing recess 29 which defines, with the inclined edges of the open wall 26, the laterally spaced bearing surfaces 27. This recess 29 permits the flow of gas from the housing over the weld bead 16 for additional cooling.

To slow the thrust of the argon or other gas flowing from the housing and to provide for an easy uniform flow of gas from the housing, the housing is preferably filled with a mass of porous material such as a mass of matted metallic fibers 33, commonly known as steel wool. This mass is of course disposed between the gas inlet 23 and the open wall 26 of the trailer housing. Preferably the porous mass 33 is retained within the housing by suitable means such as a coarse mesh screen 34 secured in the housing adjacent to the open wall 26.

In use, the trailer 20 is clamped to the welding tip 10 in desired relation so that the trailer bearing surfaces 27 may rest on the work pieces 14 and 15 and support the tip electrode 11 in the desired spaced relation to the work for producing the welding arc. For the welding operation, the assembly is moved from left to right, as indicated in FIGS. 1 and 2 by the arrows 19. Prior to the welding operation of course the argon or other gas is supplied both to the tip 10 and to the trailer 20 through suitable conduits and valves. The gas flowing from the tip 10 will flood and surround the electrode 11 and the welding arc; and the gas flowing from the housing 20 will merge with the tip gas to completely flood the weld area during the time of initial cooling and for a time thereafter as the trailer moves over the welded joint. The weld metal is supplied to the joint separately by means of a rod which is introduced to the area of the arc; and as the assembly is moved over the joint, the fusion and cooling of the metals occurs in an atmosphere from which the ambient air is completely excluded.

The size of the trailer device is not critical; however by way of example the trailer illustrated in FIG. 1 may have a diameter of about 1 inch, a length of about 3 inches, with the trailer being attached to a welding tip having a diameter of about five-eighths inch. The size of the trailer would depend to some extent of course on the size of the weld joint to be made and the amount of gas that is required to be flowed over the joint to accomplish the desired results.

FIGS. 5 through 8 illustrate another form of trailer according to the invention which is disposed at right angles to a welding tool tip 10a, as opposed to the parallel arrangement above described. This form of trailer is useful generally in the situation where it is desired to maintain the weld bead in an inert atmosphere for a much longer period, for making a wider and heavier weld for example. In this form, the trailer includes a body 41 which again may be a tubular body but which defines an open wall 42 at one side. As viewed from the end, the tubular body 41 is slightly more than semi-cylindrical. The trailing end of the trailer is substantially completely closed by an end cap 43, with the free edge of the end cap being slightly spaced from the plane of the open wall 42, defining a recess 44 for a purpose to be described. An end cap 45 at the leading end of the body 41 covers only approximately the top half of the housing, defining a much larger recess 46 communicating with the open wall 42. A suitable clamp such as a gear type clamp 48 is secured to the leading end cap 45 for rigidly attaching the trailer 42 a welding tip 10a.

The gas inlet for this trailer 40 is defined by an elongated tube 50 supported within the body 41 and generally coextensive with the body, and projecting through the trailing end cap 43 to define a nipple 51 to which a suitable hose or conduit 52 may be attached for supplying gas to the trailer. The tube 50 is preferably closed at its leading end and is provided with axially spaced ports 53 which are preferably directed upward or away from the open wall 42.

Again the trailer housing is substantially filled with a porous material such as steel wool 56; and in this case the steel wool surrounds the tube 50 and defines at least a porous wall between the tube 50 and the open wall 42 for diffusing the gas flowing from the tube. Again, the porous mass may be maintained within the housing by means of a suitable open mesh screen 57 secured within the housing.

In use, this trailer 40 trails the welding tip 10a; and is attached to the welding tip 10a in a manner that the side edges of the body 41 which define the open wall 42 also define runners which rest on the work 14a and support the welding tip electrode 11a in desired spaced relation to produce the welding arc. Desirably the trailer 11 is sized so that the runners 42 will span the weld bead 16a.

With the arrangement of the tube parts 53 and porous mass 56, the gas is well diffused in the housing and flows from the leading and recess 44 to merge with the gas flowing from the welding tip 10a as above described to maintain the inert atmosphere surrounding the arc and over a substantial length of the weld bead to assure cooling of the bead in the inert atmosphere. The trailing recess 44 provides a slight clearance for the bead 16a to assure that the runners 42 will maintain contact with the work 15a, and also permits some flow of gas from the trailer rearward for additional cooling of the bead.

What has been described is apparatus for use in the welding of titanium and other exotic metals and the method for welding such metals, which are novel and unique and which provide many advantages over other known techniques for this type of welding. It has been observed that welds made with these devices and in accordance with this technique are better, both from the standpoint of structural soundness and from appearance, than welds which have been made in the enclosed dome apparatus described above. Another advantage is that the welding is performed under relatively normal circumstances. Except for unusually large and cumbersome parts, the welding can be performed in welding booths, as in conventional welding, with the parts being placed in any orientation desired by the welder. A further advantage is that the devices are relatively simple and inexpensive and are readily attached to the welding tool tips in any desired relationship at the convenience of the welder. A still further advantage is that very little special set up time is required. It is only necessary to attach the welding trailer to the welding tool tip and hook up a trailer to the argon gas which requires relatively little time. In relation to the other described known techniques there are many savings from the standpoint of labor time for the actual welding, from the standpoint of labor time in setting up the parts for welding, from the standpoint of eliminating the need for expensive fixtures of tooling, from the standpoint of dead time waiting for replacement of the atmosphere in an inert gas envelope, and from the standpoint of minimizing use of the inert gas.

While preferred embodiments of the invention have been illustrated and described, it will be understood by those skilled in the art that changes and modifications may be resorted to without departing from the spirit and scope of the invention.

What is claimed is:

1. A gas flooding device for attachment to a welding tool tip comprising
   a housing defining an enclosure having one open wall, a leading side wall, and a trailing side wall; clamp means extending forwardly of the leading side wall of said housing for attaching said housing in tandem relation with a welding tool tip, with said leading side wall disposed adjacent to said welding tip and with said open wall disposed to confront the work;
   said device having gas inlet means for said enclosure, disposed in spaced relation to said open wall; gas diffusion means defined by a porous partition disposed in said enclosure, separating said gas inlet means from said open wall;
   said housing having means defining at least one bearing surface for engagement with the work, to position said device in relation to the work;
   means in said housing enclosure defining an open leading recess communicating with said open wall for directing gas from said enclsoure forwardly beyond said leading side wall;
   and means in said housing enclosure defining an open trailing recess communicating with said open wall and bridging the weld bead, said trailing recess being dimensioned to direct gas from said enclosure rearwardly beyond said trailing side wall.

2. A gas flooding device as set forth in claim 1 said gas diffusion means comprising a mass of matted metal fibers.

3. A gas flooding device as set forth in claim 1 said bearing surface means being disposed to support said open wall in close relation to the work and to engage the work at one side, at least, of the weld bead.

4. A gas flooding device as set forth in claim 3 said gas diffusion means being disposed adjacent to said enclosure open wall.

5. A gas flooding device as set forth in claim 1 said housing defining an elongated tubular enclosure having one open end defining said open wall.

6. A gas flooding device as set forth in claim 5 said enclosure open wall being disposed generally in a plane transverse to the longitudinal axis of said enclosure; said enclosure leading side wall having a recess communicating with said open wall and defining said leading recess.

7. A gas flooding device as set forth in claim 6 said enclosure trailing side wall having means defining a recess communiciating with said open wall and defining said trailing recess; and said enclosure having means between said leading and trailing recesses defining said bearing surfaces.

8. A gas flooding device as set forth in claim 5 said enclosure open wall being inclined relative to a plane perpendicular to its longitudinal axis, with its leading edge spaced from said perpendicular plane to define said leading recess; and said inclined open wall defining, in addition, lateral recesses for directing gas laterally from said enclosure.

9. A gas flooding device as set forth in claim 5 in combination with a welding tool having an elongated hollow tip and an electrode projecting axially from the center of said tip, said tip defining a gas flooding nozzle; said device being clamped to said tip by said clamping means whereby said housing bearing means serves to position both said device and said attached tip in relation to the work surface; and said device leading recess adapted to direct gas from said housing enclosure to merge with the gas flowing from said tip nozzle.

10. A gas flooding device as set forth in claim 1
said housing defining an elongated enclosure having one open side defining said open wall, with its ends defining said leading and trailing side walls.

11. A gas flooding device as set forth in claim 10
an elongated perforated tube disposed in said housing enclosure, generally coextensive therewith, and in spaced relation with said open wall; said tube defining said gas inlet means.

12. A gas flooding device as set forth in claim 10
said housing enclosure defining lateral side walls whose longitudinal edges at said open wall define said bearing surfaces; and said leading and trailing side walls terminating short of the plane of said bearing surfaces to define the respective leading and trailing recesses.

13. A gas flooding device as set forth in claim 10
in combination with a welding tool having an elongated hollow tip and an electrode projecting axially from the center of said tip, said tip defining a gas flooding nozzle; said device being clamped to said tip by said clamping means whereby said housing bearing means serves to position both said device and said attached tip in relation to the work surface; and said device leading recess adapted to direct gas from said housing enclosure to merge with the gas flowing from said tip nozzle.

14. A gas flooding device as set forth in claim 1
in combination with a welding tool having an elongated hollow tip and an electrode projecting axially from the center of said tip, said tip defining a gas flooding nozzle; said device being clamped to said tip by said clamping means whereby said housing bearing means serves to position both said device and said attached tip in realtion to the work surface; and said device leading recess adapted to direct gas from said housing enclosure to merge with the gas flowing from said tip nozzle.

* * * * *